United States Patent

Roeschlein et al.

[15] 3,704,364

[45] Nov. 28, 1972

[54] DIGITAL MEMORY SHIFT REGISTER INCORPORATING TARGET DATA AVERAGING THROUGH A DIGITAL SMOOTHING LOOP

[72] Inventors: Eugene R. Roeschlein; Donald C. Weiss; David L. Zeph, all of Indianapolis, Ind.

[73] Assignee: The United States of America as represented by the Secretary of the Navy

[22] Filed: Nov. 10, 1970

[21] Appl. No.: 88,432

[52] U.S. Cl. ....................................235/176, 235/152

[51] Int. Cl. ................................................G06f 7/50

[58] Field of Search........................235/176, 156, 152

[56] References Cited

UNITED STATES PATENTS

| | | | |
|---|---|---|---|
| 3,521,043 | 7/1970 | Thompson | .............235/176 X |
| 3,531,632 | 9/1970 | Herr | ..........................235/176 |
| 3,566,097 | 2/1971 | Hildebrandt | ...........235/176 X |

*Primary Examiner*—Malcolm A. Morrison
*Assistant Examiner*—David H. Malzahn
*Attorney*—R. S. Sciascia and P. S. Collignon

[57] ABSTRACT

A digital memory shift register subsystem having a series of eight 1,024 bit shift register modules coupled together to create serial storage of 512 16-bit digital words of target information through a full adder and a full subtractor, a part of the digital memorized target information being taken as an output from the memory shift register prior to its end bit and conducted to a supplemental shift register and multiplexer combination circuit to add in and subtract from the target information digital information in the memory shift register by this recirculation to provide outputs to a display and other circuits of a sonar receiver.

6 Claims, 3 Drawing Figures

INVENTORS
EUGENE R. ROSECHLEIN
DONALD C. WEISS
DAVID L. ZEPH

BY H. H. Losche
ATTORNEYS

INVENTORS
EUGENE R. ROESCHLEIN
DONALD C. WEISS
DAVID L. ZEPH

BY H. H. Losche

ATTORNEYS

DIGITAL MEMORY SHIFT REGISTER INCORPORATING TARGET DATA AVERAGING THROUGH A DIGITAL SMOOTHING LOOP

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

In the present invention all integrated circuit (IC) modules are used whenever possible to conserve space and weight. The storage or memory component is built up from a plurality of dual 512-bit shift register modules that serially receive binary word target information at a clock pulse frequency. The target digital word signals originate from sonar hydrophones and are processed through a correlation counter and a parallel-to-serial converter to this memory shift register (MSR) circuit. The correlation counter and the parallel-to-serial converter are controlled by timing pulses from a timing generator that generates New Word Enable (NWE and $\overline{NWE}$) pulses, sync and clock pulses (FIT), and New Word Reset pulses ($\overline{NWR1}$ and $\overline{NWR2}$). While the NWE pulse is high, the correlation counter is disabled by the low $\overline{NWE}$ pulse and the parallel-to-serial converter is enabled by the NWE pulse to operate in the parallel mode. Entry to the parallel-to-serial converter from the correlation counter of the target digital word occurs on the sync pulse of the FIT pulse series. When the NWE pulse goes low, the correlation counter, having been reset by $\overline{NWR1}$ and $\overline{NWR2}$, resumes its normal operation of counting correlations of the hydrophone inputs. The parallel-to-serial converter resumes operation in the serial mode. The target information digital word is coupled in series through a full adder and a full subtractor to the MSR. An output from the MSR is taken 32 bits early and applied serially to a supplemental shift register of 32 bits to produce a parallel output to a multiplexer which 32 bits are divided according to a three bit digital control word to fix the access point of the part of the target digital word to subtract from the input target information digital word after updating this word with new target digital word information. This feedback to update the target information digital word and the recirculation of the significant part of the target digital word provides smoothing action so as to allow the generation of integrated or weighted target digital word information. It is accordingly, a general object of this invention to provide an MSR composed entirely of integrated circuits to smooth long series of digital words of target information for display and other circuits.

BRIEF DESCRIPTION OF THE DRAWING

These and other objects and the attendant advantages, features and uses will become more apparent to those skilled in the art as a more detailed description proceeds when taken along with the accompanying drawing illustrating the invention in which.

DESCRIPTION OF THE PREFERRED EMBODIMENT

Figures 1A, 2:
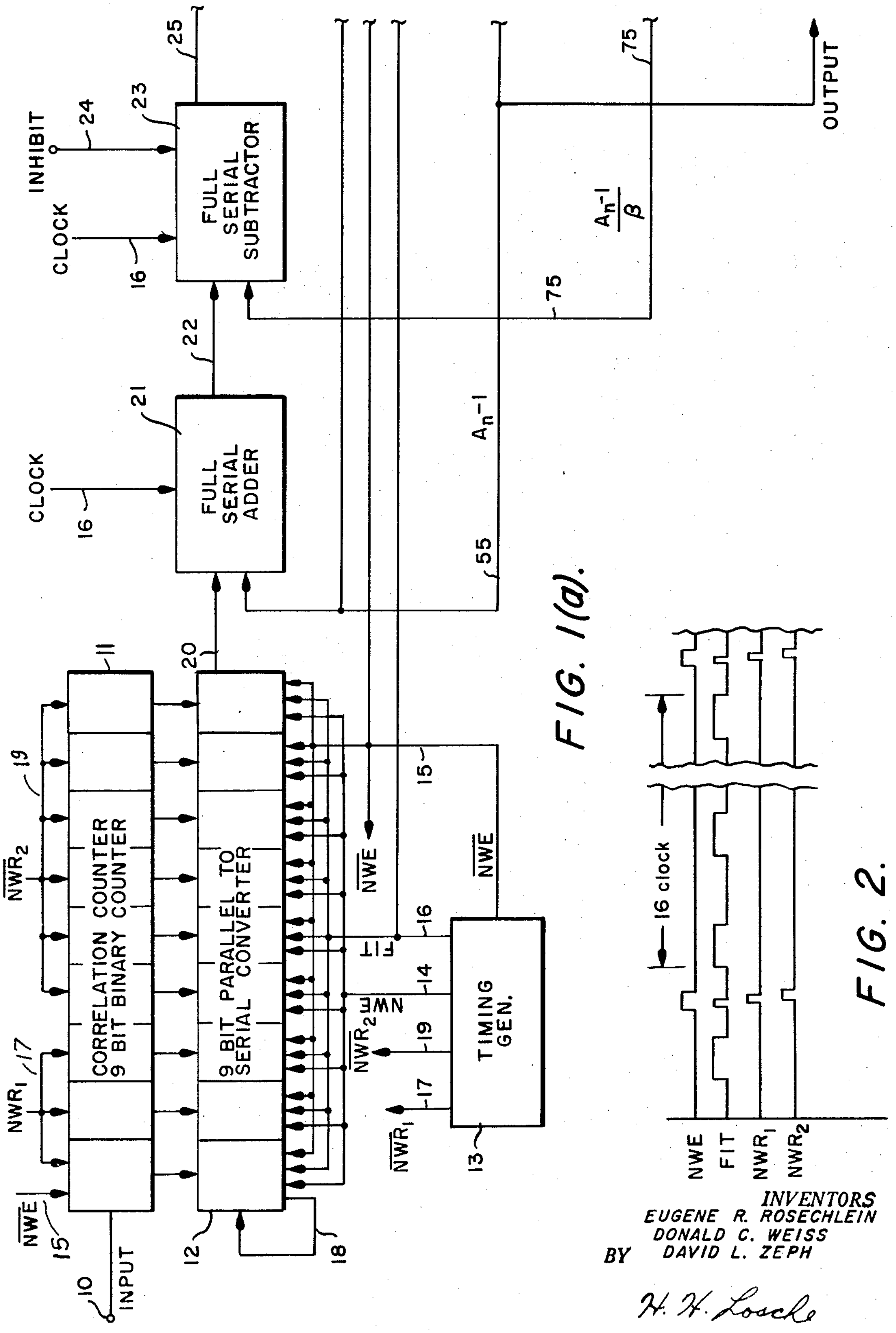
FIG. 2 is a graph of waveforms produced by the timing generator.

Referring more particularly to the figures of drawing there is illustrated in block circuit schematic the memory shift register (MSR) of this invention shown in its environment for use in a SONAR receiver. In a SONAR receiver hydrophones are strategically placed about a carrier and the audio information processed down to a correlation circuit to provide a number of correlation signals from the several hydrophones. In this invention the information signals out of the correlation circuits are serially applied by way of a conductor input 10 to a correlation counter 11 of nine bits providing new target information. The nine stages of the correlation counter 11 are coupled in parallel to a nine-bit parallel-to-serial converter 12. To activate the converter 12, signals from a timing generator 13 capable of producing NWE pulses on conductor 14, $\overline{NWE}$ pulses on conductor 15, FIT pulses on conductor 16, and $\overline{NWR1}$ and $\overline{NWR2}$ pulses on conductors 17 and 19 are generated. The various pulses are illustrated in the waveform graph in FIG. 2. The NWE, $\overline{NWE}$, FIT, $\overline{NWR1}$ and $\overline{NWR2}$ pulses of the timing generator 13 are coupled to both the counter 11 and converter 12 to synchronously operate these two components. When the $\overline{NWE}$ signal on conductor 15 is high (or logic "1"), the correlation counter 11 responds to correlation pulses on input 10 while the converter 12 operates in the serial mode when the NWE signal on 14 is low (or logic "0"). Each sync clock pulse of the FIT causes the data from the counter 11 to go in parallel to the serial converter 12. Inversion in the parallel dumping from the counter 11 to the converter 12 of the most significant bit (MSB) of the counter makes 256 the zero point. An example of the binary arithmetic is given as follows:

where the positive values of the correlation counts range, reading from right to left, from:

$$+255 = 1\ 1111\ 1111$$

$$+1 = 1\ 0000\ 0001$$

$$0 = 1\ 0000\ 0000$$

Negative values of the correlation count range from:

$$-1 = 0\ 1111\ 1111$$

$$-256 = 0\ 0000\ 0000$$

where the ninth bit to the left is the sign bit. The bits are placed in groups of fours for ease of understanding but have no significance otherwise. The ninth flip-flop of the parallel-to-serial converter 12 recirculates on itself as shown by 18 adding seven bits like the ninth sign bit to the eight data bits from the counter forming a 16-bit word of the same magnitude and sign as the original nine-bit input. Expressed as 16-bit numbers in two's complement form (TC) for the inversion which comes from the Q outputs of the counter, the above correlation counts become:

$+255_{TC} = 0000\ 0000\ 1111\ 1111$ $+1_{TC} = 0000\ 0000\ 0000\ 0001$ $0_{TC} = 0000\ 0000\ 0000\ 0000$ $-1_{TC} = 1111\ 1111\ 1111\ 1111$ $-256_{TC} = 1111\ 1111\ 0000\ 0000$

Figure 1B:
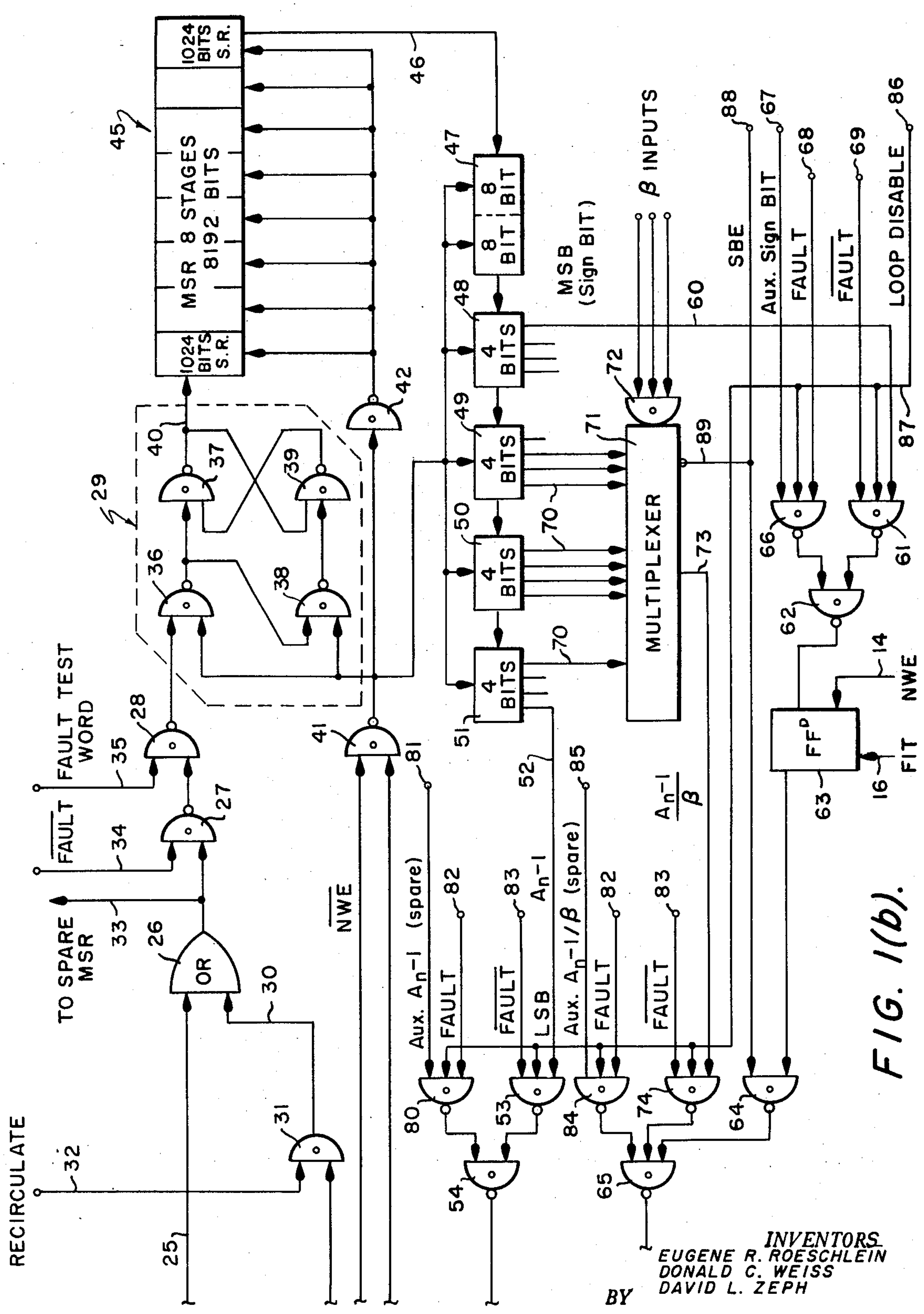
FIG. 1 being a single Figure in two parts, FIG. 1*a* and FIG. 1*b*, on two sheets illustrates a schematic block circuit diagram of the circuit components of the invention with the information flowing in the direction of the arrows.

This 16-bit digital word of target information is serially read out over the output conductor 20 to a full serial adder 21 which is clocked by the clock pulse source over conductor 16. The output of the adder 21 is by way of the conductor means 22 to a full serial subtractor 23 also having the clock pulse source applied by way of a conductor means 16. The clock pulse source over conductor 16 as an input to the adder 21 operates the carry flip-flop while the clock pulse source over conductor 16 applied to the subtractor operates the borrow flip-flop circuit. When it is desirable to inhibit the normal operation of the subtractor circuit 23 in case of dumping the digital word out of the MSR or of re-circulating the target digital word through the MSR, an inhibit signal may be applied over the input 24 to the subtractor 23. Subtractor 23 serially reads out over the conductor 25 through an OR gate 26, a NAND gate 27, and a NAND gate 28 to a latch circuit 29. A second input 30 to OR gate 26 comes as an output from an AND gate 31 to which is applied, as one input, a signal pulse by way of conductor means 32 to cause recirculation in the MSR. The output of the OR gate 26 may be conducted by branch conductor 33 to a spare MSR circuit when a fault exists in the MSR circuit. A second input to the NAND gate 27 is from a conductor 34 from related MSR circuitry showing a fault which in a normal operation has a $\overline{\text{fault}}$ signal standing thereon, as detected in FIG. 1*b*. A second input 35 to NAND gate 28 may have a "fault test word" applied thereto under conditions of test into a defective MSR. The latching circuit 29 consists of four NAND gates 36, 37, 38, and 39, having the output of 36 through NAND gate 37 constituting the output 40 for the circuit. The output of NAND gate 36 is also coupled as an input to NAND gate 38, the output of which is an input to NAND gate 39, the output of which is an input to NAND gate 37. The output 40 of NAND gate 37 is applied as a second input to NAND gate 39. A second input to each of the NAND gates 36 and 38 is a clock pulse coming from the clock source over conductor 16 through a NAND gate 41 which inverts to provide $\overline{\text{FIT}}$. The latching circuit 29 allows the data going into the MSR to remain stable during the trailing edges of the clock pulses to assure complete read-in to the MSR of the digital target signal information.

The output 40 of the latch circuit 29 is coupled as an input to the MSR identified as a whole herein by the reference character 45. The MSR 45 consists of eight stages of dual 512-bit shift registers in modular form producing a total length of 8,192 bits. The input from 40 is serially read into the MSR 45 clocked in by clock pulses over conductor 16 through the NAND gate 41 and a NAND gate 42 in parallel to the eight MSR stages. The MSR 45 accordingly memorizes 512 of the 16-bit serial digital target information serially read in and serially clocked down the register in accordance with the clock pulses applied thereto.

The output of the MSR 45 is taken 32 bits early; that is, the output is taken 32 bits prior to the last bit, or the 8,160th bit, and conducted by way of the output conductor means 46 to a supplemental shift register of 32 bits consisting of a dual eight-bit shift register 47 and four four-bit shift registers 48, 49, 50, and 51. The output of the MSR 45 is taken 32 bits early out of the last 1,024-bit module, or the 992th bit, since there is no available tap within the last 32 bits of a flat-pack module although only the last 16 bits are needed for a complete word of the data information and sign bit. These 32 bits are exactly matched in delay in the supplemental shift register 47–51 to produce the $A_{n-1}$ at the same time that this word would also appear as the output for the full 8,192-bit MSR output. The clock pulses are also conducted by conductor 16 through NAND gate 41 to each of these shift registers in synchronism with the rest of the system. The supplemental shift register shifts the digital target information out of the MSR 45, which is 32 bits early, to the last bit output 52 making up the 32 bits and constituting the least significant bit (LSB) out of the supplemental register.

The 16 bits in registers 48–51 provide the needed word while the word of 16 bits in the register 47 are not needed in this clocked arithmetic cycle. The 16 bits in register 47 will be shifted down to 48–51 during this same clocked arithmetic cycle. The LSB is conducted through a NAND gate 53 and NAND gate 54 by way of conductor means 55 as the second input through the full serial adder 21 and as a second input to the AND gate 31. The 16 digital bits out of the supplemental shift registers 48–51 will make up the old digital word of target information bits and are represented herein by $A_{n-1}$ which have added to them the 16 target digital information bits or data coming by way of the conductor 20 from the parallel-to-serial converter 12. Whenever an inhibit signal on the conductor 24 is applied to the serial subtractor 23 and a recirculating signal is applied to conductor 32 to the AND gate 31, the storage of the target signal information in the MSR 45 may be recirculated and retained without injection of any new target signal data.

The first bit out of the first four-bit shift register 48, which constitutes the MSB of the digital word through the supplemental register, is the sign bit of the digital word on the output 60 through NAND gate 61 and NAND gate 62 to a flip-flop register 63 as the D input. The flip-flop 63 is controlled by the NWE pulse over conductor 14 such that whenever the sync pulse of the FIT series over 16 occurs, the sign bit on the D input will be read into FF63. A second input to NAND gate 62 is from a NAND gate 66 to which is applied an "auxiliary sign bit" from the terminal 67 and a second input is a "fault signal" from terminal 68. A second input to NAND gate 61 is a $\overline{\text{fault}}$ signal on terminal 69. The MSB is applied through the NAND gates 61, 62, and 64 through the flip-flop circuit 63 at the proper synchronized time to the NAND gate 65 for the reason soon to be described. The last three bits of the four-bit shift register 49, all four bits of the four-bit shift register 50, and the first bit of the four-bit shift register 51 are outputs 70 applied in parallel to a multiplexer circuit 71 constituting eight digital inputs thereto. One of the eight inputs is selected by a digital control word of three bits identified herein as $\beta$ inputs through an AND gate 72 and is therefore conducted to output 73. The $\beta$ inputs are selected manually at a console of the equipment to select the appropriate tap or binary position in the digital word which, in mathematical operation, divides the 16-bit digital word by $\beta$ to produce on the multiplexer output 73 the mathematical expression $(A_{n-1}/\beta)$. The multiplexer 71 may be of any well known type to select one bit out of eight by division, one of which is commercially available from Fairchild Semiconductor Company under a number identification of 9312. The output 73 conducted through a NAND gate 74 has a second input to NAND gate 65 which, together with the output of NAND gate 64, produces the digital word $(A_{n-1}/\beta)$ adding to this output a plurality of sign bits equal to the number of bits eliminated by the $\beta$ selection. The output of the NAND gate 65 is by way of the conductor means 75 as a second input to the full serial subtractor circuit 23. The values of division of $A_{n-1}$ used to compute $(A_{n-1}/\beta)$ range from 8 through 1,024 corresponding to $\beta = 000$ through $\beta = 111$, respectively, or eight selections. The three-bit binary number used to represent $\beta$ refer to the logic levels used to convey the $\beta$ information rather than the numerical value of division of $A_{n-1}$. The 16-bit word is accordingly divided by 8, 16, 32, 64, 128, 256, 512, and 1,024, as selected for $\beta$ on the console to shift $A_{n-1}$ from 3 to 10 times earlier in position. As an example of the addition of the 16-bit old word $(A_{n-1})$ with the new word entered by conductor 20 into full adder 21 and the subtraction of $(A_{n-1}/\beta)$ from the sum in full subtractor 23 the following arithmetic computations are given in which $\beta = 000$ so $(A_{n-1}/\beta)$ is the amount divided by 8, with digits read from right to left, the right bits being data bits and the left most 16th bit being the sign bit:

| | | | | | |
|---|---|---|---|---|---|
| Old Word | 0000 | 0000 | 0100 | 0000 | = 64 |
| New Word | 0000 | 0000 | 0010 | 0000 | = 32 |
| Sum | 0000 | 0000 | 0110 | 0000 | = 96 |
| $A_{n-1}/\beta$ | 0000 | 0000 | 0000 | 1000 | = 8 |
| Difference | 0000 | 0000 | 0101 | 1000 | = 88 |

An example having the negative sign bit is shown in the following in two's complement. Example:

| | | | | | |
|---|---|---|---|---|---|
| Old Word$_{TC}$ | 1111 | 1111 | 1100 | 0000 | = −64 |
| New Word$_{TC}$ | 1111 | 1111 | 1110 | 0000 | = −32 |
| Sum$_{TC}$ | 1111 | 1111 | 1010 | 0000 | = −96 |
| $A_{N-1}/\beta_{TC}$ | 1111 | 1111 | 1111 | 1000 | = −8 |
| Difference$_{TC}$ | 1111 | 1111 | 1010 | 1000 | = −88 |

This repeated or continuous cycling of addition and subtraction of old and new words of target data information eventually arrives at a point of equilibrium where in the following expression:

$$A_{n-1}\text{ (old word)} + A_n\text{ (new word)} - (A_{n-1}/\beta)$$

$A_n$ eventually equals $(A_{n-1}/\beta.)$ This point of equilibrium is achieved at various rates (or time constant) depending upon the value of $\beta$. Thus with large values of $\beta$ a longer integration time is achieved with the older target data $(A_{n-1})$ being assigned greater significance. Conversely, with low values of $\beta$ equilibrium is achieved at a faster rate and the new target data $(A_n)$ is assigned more significance although never as much as the older established data. The output via conductor 55 therefore provides smoothed target information.

A NAND gate 80 has an input 81 for an auxiliary $A_{n-1}$ for a spare input signal as well as an input 82 for a "fault signal" from one of the companion or related MSR circuits. A second input to the NAND gate 53 is a fault signal applied to terminal 83. In like manner a NAND gate 84 has a means for an auxiliary $A_{n-1}/\beta$ or spare signal applied thereto from terminal 85 coming from companion or related MSR circuitry and also the "fault signal" from terminal 82. The NAND gate 74 has a second input, the fault input from terminal 83. The NAND gates 53, 61, 66, 74, 80, and 84 all have a third input from a "loop disable" terminal 86 by way of the conductor means 87 to disable these NAND gates and stop the flow of information therethrough. The NAND gate 64 has a second input thereto from a terminal 88 providing a "sign bit enable" (SBE) signal applied to terminal 88. A branch conductor 89 applies this SBE signal to the multiplexer 71 as an inhibit signal which causes the multiplexer to put out only "zero" when the SBE signal is present ultimately adding to output 75 a plurality of sign bits via FF63 and NAND gate 64 equal to the number of bits eliminated by the $\beta$ division.

The NAND gates 80, 84, and 66 allow feedback from the spare MSR while the NAND gates 53, 74, and 61 cut off the feedback from the defective MSR, it being realized that three other such MSR circuits or any other desirable number may be used in processing the target digital information.

OPERATION

Signals from appropriate hydrophones are compared (correlated) and these correlations are counted by the correlation counter 11. When the NWE pulse goes high ("1") on 14 enabling the converter 12, the correlation counter 11 is disabled from counting by a low ("0") NWE on 15 and is dumped in parallel into the parallel-to-serial converter 12 by the sync pulse on the FIT pulse series. The counter 11 is then reset by the NWR1 and NWR2 pulses. The parallel-to-serial converter 12 is then serially read out into the full adder 21 when NWE goes low once again. The old digital target signal data, which has been passed to the MSR 45, is conducted through the supplemental shift register 47–51 through the NAND gate 54 and over the conductor means 55 to have the new digital target data added to the old digital target data to be serially read out over the conductor 22 and into the full serial subtractor circuit 23. The part of the old digital date target word, selected out of the supplemental shift register through the outputs 70 to the multiplexer and divided by the $\beta$ inputs, which separates it into its most significant target information with a part of the digital data designating the sign bit, is passed through the NAND gate 65 as the digital word $A_{n-1}/\beta$ to the full serial subtractor circuit 23 to subtract from the updated digital target data word coming by way of 22. The now updated digital target data word of 16 bits is passed through the OR gate 26, NAND gate 27, NAND gate 28, and latching circuit 29 as updated target digital data into the MSR 45. When it is desired to block the introduction of new target signal data, an inhibit signal over conductor 24 and a recirculating signal over conductor 32 are applied to the subtractor circuit 23 and AND gate 31, respectively, to cause the old target digital data $A_{n-1}$ to recirculate back into the MSR 45. Where it is desirable to dump the target signal digital data in the MSR 45, an inhibit signal 24 may be applied to the full subtractor circuit and the digital data in MSR 45 will run itself out to an all "-zero" state. The MSR 45 and its related circuitry herein produce a smoothing effect on the digital target data by continuously averaging true target information and minimizing the effects of spurious correlations caused by noise, etc.

The various counters and shift registers as well as the full serial adder, full serial subtractor, multiplexer, and NAND gates are all of well known marketed construction manufactured and supplied in modular form and are not considered to require individual explanation or description thereof. All NAND gates are of the usual type in which a low output will be produced when all inputs are high and a high output will be produced when any one of the inputs are low.

While many modifications may be made in the constructional arrangement to provide a departure of operation as described herein, it is to be understood that we desire to be limited in the spirit of our invention only by the scope of the appended claims.

We claim:

1. A digital memory shift register for storage of a multitude of target signal digital words with provision for constantly updating these target signal digital words and for smoothing the digital words for display and analysis comprising:

- a plurality of shift register modules coupled together to produce a long serial memory shift register having a single input and an output;
- a full serial adder having a first input adapted to receive a new target digital word, a second input, and an output and a full serial subtractor having a first input coupled to said full serial adder output, and a second input, and an output coupled to said plurality of shift register modules single input;
- a supplemental shift register of 32 bits coupled to said memory shift register output with an output for the least significant bit, a plurality of other parallel outputs, and an output of the most significant bit of the target information taken therefrom;
- a multiplexer circuit having a plurality of inputs coupled to receive said plurality of other parallel outputs on said inputs and having a three-line digital word control select inputs for dividing the digital word in said supplemental register applied by said parallel outputs to produce a divided digital word on an output;
- a logic system of NAND gates, the output of said least significant bit being through first and second NAND gates to said full adder second input to add in old target signal information with new target digital signal information therein by way of said first input to update this target information, the output of said multiplexer being through third and fourth NAND gates to said full subtractor by said second input to leave only the significant part of said target digital word established by said three-line digital control word, and the most significant bit output being coupled through fifth, sixth, seventh, and said fourth NAND gates to said full subtractor second input to establish the sign of the multiplexer digital word, said first, third, and fifth, NAND gates having fault signals applied thereto as second inputs; and
- a timing source coupled to said plurality of shift register modules, to said supplemental register, to said full adder, and to said full subtractor to synchronize the counting sequence and the circulating and updating of said digital target signal information whereby the target signal digital information is memorized and smoothed for steady flow of this digital information to the display and analysis sections of a sonar receiver.

2. A digital memory shift register as set forth in claim 1 wherein said coupling between said full adder and full subtractor and said plurality of shift register modules includes an OR gate and a latching gate, a second input of said OR gate being through an AND gate to the output of said second NAND gate, and the second input to said AND gate being a recirculating source to recirculate the target signal digital information into said memory shift register without being updated and divided.

3. A digital memory shift register as set forth in claim 2 wherein said memory shift register consists of eight dual 512-bit modules producing 8,192 bits organized into 16-bit words, and said memory shift register output of a plurality of bits preceding the last bit consists of 32 bits.

4. A digital memory shift register as set forth in claim 3 wherein said supplemental shift register consists of a dual eight-bit shift register and four four-bit registers coupled in serial relation, said plurality of parallel outputs being eight bits consisting of three bits from the second four-bit shift register, all four bits from the third four-bit shift register, and one bit from the fourth four-bit shift register, said output for the least significant bit being from the fourth four-bit shift register, and said most significant bit being from the first four-bit shift register.

5. A digital memory shift register as set forth in claim 4 wherein said latching gate is a circuit of four NAND gates intercoupled to keep each digital input signal in existence beyond the trailing edge of the timing synchronizing pulses.

6. A digital memory shift register as set forth in claim 5 wherein said single input of target signal digital information is of 16 bits, said most significant bit coming from said first four-bit shift register establishing said sign of the product being for a 16-bit word to said full serial subtractor.

* * * * *

PO-1050
(5/69)

UNITED STATES PATENT OFFICE
CERTIFICATE OF CORRECTION
UNDER RULE 322

Patent No. 3,704,364 Dated November 28, 1972

Inventor(s) EUGENE R. ROESCHLEIN ET AL

It is certified that error appears in the above-identified patent and that said Letters Patent are hereby corrected as shown below:

In the ABSTRACT, line 10, after the word "information" first occurrence add -- digital word to update same and to smooth the target --.

Column 2, line 35 of the patent change "NWE"

to read $\overline{NWE}$

Column 2, line 66 of the patent, change "Q"

to read $\overline{Q}$

Signed and sealed this 15th day of May 1973.

(SEAL)
Attest:

EDWARD M.FLETCHER,JR.
Attesting Officer

ROBERT GOTTSCHALK
Commissioner of Patents